United States Patent
Hager et al.

(10) Patent No.: US 6,294,608 B1
(45) Date of Patent: Sep. 25, 2001

(54) EMULSIONS OF ORGANOSILICON COMPOUNDS FOR IMPARTING WATER REPELLENCY TO BUILDING MATERIALS

(75) Inventors: Rudolf Hager, Altötting; Marianne Kreuzpointner, Winhöring; Hans Mayer, Burghausen, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/163,729

(22) Filed: Sep. 30, 1998

Related U.S. Application Data

(63) Continuation-in-part of application No. 08/930,966, filed as application No. PCT/EP96/01993 on May 10, 1996, now abandoned.

(30) Foreign Application Priority Data

May 11, 1995 (DE) .............................. 195 17 346
Oct. 9, 1997 (DE) .............................. 197 44 612

(51) Int. Cl.⁷ .............................. C08L 83/06; C08L 83/08
(52) U.S. Cl. .................. 524/838; 524/837; 106/287.11; 106/287.16
(58) Field of Search .................. 524/837, 838; 106/287.11, 287.16

(56) References Cited

U.S. PATENT DOCUMENTS

| | | | |
|---|---|---|---|
| 4,247,330 | * | 1/1981 | Sanders, Jr. .............................. 106/3 |
| 4,509,981 | * | 4/1985 | Sanders, Jr. et al. ..................... 106/3 |
| 4,631,207 | * | 12/1986 | Price ..................................... 427/387 |
| 4,757,106 | * | 7/1988 | Mayer et al. ........................ 524/262 |
| 4,877,654 | | 10/1989 | Wilson . |
| 4,887,770 | * | 12/1989 | Ona et al. ............................. 428/447 |
| 5,039,724 | * | 8/1991 | Demlehner et al. .................. 524/267 |
| 5,091,002 | * | 2/1992 | Schamberg et al. ...................... 106/2 |
| 5,196,054 | | 3/1993 | Schmuck et al. . |
| 5,205,860 | | 4/1993 | Narula et al. . |
| 5,300,327 | | 4/1994 | Stark-Kasley et al. . |
| 5,466,746 | * | 11/1995 | Geck et al. .......................... 524/837 |
| 5,562,761 | * | 10/1996 | Dirschl et al. ...................... 252/8.62 |
| 5,712,343 | * | 1/1998 | Geck et al. .......................... 524/837 |

FOREIGN PATENT DOCUMENTS

| | | | |
|---|---|---|---|
| 2171168 | | 10/1996 | (CA) . |
| 195 17 346 A1 | | 11/1996 | (DE) . |
| WO 96/35652 | * | 11/1996 | (DE) .............................. C04B/41/49 |
| 0 476 452 A2 | | 3/1992 | (EP) . |
| 0 738 747 A1 | | 10/1996 | (EP) . |
| WO 96/35652 | | 11/1996 | (WO) . |

* cited by examiner

*Primary Examiner*—Donald R. Wilson
*Assistant Examiner*—Caixia Lu
(74) *Attorney, Agent, or Firm*—Brooks & Kushman P.C.

(57) ABSTRACT

Aqueous emulsions contain the components
- (A) organosilicon compounds which are selected from
  - (A1) $C_1$–$C_{20}$-hydrocarbon-$C_1$–$C_6$-alkoxysilanes and
  - (A2) branched organopolysiloxanes containing $C_1$–$C_6$-alkoxy groups,
- (B) organosilicon compounds which are selected from
  - (B1) $C_1$–$C_6$-alkoxysilanes containing aminoalkyl groups and
  - (B2) branched organosiloxanes containing aminoalkyl groups and
- (C) an emulsifier.

The aqueous emulsions are suitable for imparting water repellency to porous mineral building materials and building coatings and to wood.

22 Claims, No Drawings

EMULSIONS OF ORGANOSILICON COMPOUNDS FOR IMPARTING WATER REPELLENCY TO BUILDING MATERIALS

This application is a continuation-in-part of U.S. application Ser. No. 08/930,966 filed Oct. 2, 1997, now abandoned, which is the national stage application of PCT/EP96/01993, filed May 10, 1996, which claim priority to Germany application DE 195 17 346.5 filed May 11, 1995.

TECHNOLOGICAL FIELD

The invention relates to aqueous emulsions of organosilicon compounds containing alkoxy groups and organosilicon compounds containing aminoalkyl groups, and to a process for imparting water repellency to porous mineral building materials, building coatings, and to wood.

DESCRIPTION OF THE RELATED ART

Aqueous emulsions of organosilicon compounds are used in building protection, especially because of their outstanding action against impregnation by water and dirt, their environmental compatibility, and their physiological safety.

U.S. Pat. No. 4,757,106 describes the impregnation of neutral mineral building materials with an aqueous emulsion of polyorganosiloxanes having ammonium groups and polyorganosiloxanes having ethoxy groups. The water repellent effect is smaller on alkaline building materials since the ammonium groups are neutralized and the emulsion breaks. The polyorganosiloxane then scarcely penetrates into the building material.

Emulsions which contain, as an active ingredient, resin-like polyorganosiloxanes having alkoxy groups penetrate readily into porous building materials and impart good surface water repellency to them. However, dense building materials are only superficially and temporarily protected.

Although emulsions of alkylalkoxysilanes penetrate readily into building materials, these emulsions do not have a long shelf life. U.S. 4,877,654 describes buffered emulsions of alkylalkoxysilanes which, although exhibiting a long shelf life, are deposited too slowly, in particular in neutral building materials, and therefore impart water repellency poorly. This poor water repellency is noted particularly in the zone close to the surface.

Emulsions which contain resin-like polyorganosiloxanes having alkoxy groups and low molecular weight alkylalkoxysiloxanes or alkylalkoxysilanes as active ingredients are disclosed in U.S. Pat. No. 5,039,724. These emulsions are a compromise between a long shelf life and a water repellent action at the surface.

U.S. Pat. No. 5,196,054 describes an emulsion which, in addition to siloxanes and silanes containing alkyl and alkoxy groups, also contains a mixture or a reaction product of a silane containing aminoalkyl groups and α,ω-hydroxypolydialkylsiloxane. Although these components result in more rapid formation of the hydrophobic character on the surface of the building material, they impede the penetration of the other active components into the deep pores of the building material.

SUMMARY OF THE INVENTION

It is the object of the invention to provide aqueous emulsions of organosilicon compounds for imparting water repellency to porous mineral building materials and building coatings, these emulsions exhibiting a long shelf life, and to provide a process for imparting water repellency to porous mineral building materials and coatings, a process which is particularly effective in the case of neutral and basic building materials and coatings, and which does not have the disadvantages of the emulsions described above. These objects are achieved by employing aqueous emulsions of organosilicon compounds containing alkoxy groups and organosilicon compounds containing aminoalkyl groups.

DESCRIPTION OF THE PREFERRED EMBODIMENT

The invention relates to an aqueous emulsion which contains the components (A) organosilicon compounds which are selected from
   (A1) $C_1$–$C_{20}$-hydrocarbon-$C_1$–$C_6$-alkoxysilanes and
   (A2) branched organopolysiloxanes containing $C_1$–$C_6$-alkoxy groups,
(B) organosilicon compounds which are selected from
   (B1) $C_1$–$C_6$-alkoxysilanes containing aminoalkyl groups and
   (B2) branched organosiloxanes containing aminoalkyl groups, and
(C) an emulsifier.

Preferably, the $C_1$–$C_{20}$-hydrocarbon-$C_1$–$C_6$-alkoxysilanes (A1) have 1 or 2 identical or different, optionally halogen-substituted, monovalent $C_1$–$C_{20}$-hydrocarbon radicals bonded via SiC, and the other radicals are identical or different $C_1$–$C_6$-alkoxy radicals.

Examples of $C_1$–$C_{20}$-hydrocarbon radicals are alkyl radicals such as the methyl, ethyl, n-propyl, isopropyl, n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radial; decyl radicals such as the n-decyl radical; and dodecyl radicals such as the n-dodecyl radical; cycloalkyl radicals such as cyclopentyl, cyclohexyl, 4-ethylcyclohexyl, and cycloheptyl radicals, norbornyl radicals and methylcyclohexyl radicals; alkenyl radicals such as the vinyl, allyl, n-5-hexenyl, 4-vinylcyclohexyl and 3-norbornenyl radicals; aryl radicals such as the phenyl, biphenylyl, naphthyl, anthryl, and phenanthryl radicals; alkaryl radicals such as o-, m-, and p-tolyl radicals, xylyl radicals and ethylphenyl radicals; aralkyl radicals such as the benzyl radical and the α- and β-phenylethyl radicals. The unsubstituted $C_1$–$C_{12}$-alkyl radicals and the phenyl radical are particularly preferred.

Examples of halogen-substituted $C_1$–$C_{20}$-alkyl radicals are alkyl radicals substituted by fluorine, chlorine, bromine and iodine atoms, such as the 3,3,3-trifluoro-n-propyl radical, the 2,2,2,2',2',2'-hexafluoroisopropyl radical and the heptafluoroisopropyl radical.

Examples of $C_1$–$C_6$-alkoxy radicals are the methoxy, ethoxy, n-propoxy, isopropoxy, n-butoxy, isobutoxy, sec-butoxy and tert-butoxy radical; pentyloxy radicals such as the n-pentyloxy radical, and hexyloxy radicals such as the n-hexyloxy radical. The ethoxy radicals are particularly preferred. The alkoxy radicals may be substituted by halogen atoms, but this is not preferred.

The emulsion may contain a branched organopolysiloxane (A2) containing $C_1$–$C_6$-alkoxy groups or a mixture of a plurality of organopolysiloxanes (A2). The organopolysiloxanes (A2) may additionally contain hydroxyl groups, which facilitate binding to the building materials.

The organopolysiloxanes (A2) are preferably composed of units of the general formula (I)

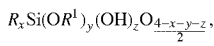   (I)

in which
R denotes identical or different monovalent optionally halogen-substituted $C_1$–$C_{20}$-hydrocarbon radicals bonded via SiC,
$R^1$ denotes identical or different monovalent $C_1$–$C_6$-alkyl radicals,
x denotes the values 0, 1, 2 or 3, on average 0.8 to 1.8,
y denotes the values 0, 1, 2 or 3, on average 0.01 to 2.0, and
z denotes the values 0, 1, 2 or 3, on average 0.0 to 0.5, with the proviso that the sum of x, y and z is on average not more than 3.5, the organopolysiloxanes (A2) having at least one unit of the general formula (I) in which the sum of x, y and z has the values 0 or 1.

The organopolysiloxane (A2) preferably has a viscosity of 5 mm²/s to 50,000 m²/s, in particular 10 mm²/s to 5000 mm²/s, at 25° C.

Examples of the $C_{1-20}$-hydrocarbon radicals are the examples of $C_1$–$C_{20}$-hydrocarbon radicals mentioned above in the case of the $C_1$–$C_{20}$-hydrocarbon-$C_1$–$C_6$-alkoxysilanes (A1).

Although not shown in the above formula, some of the radicals R may be replaced by hydrogen atoms bonded directly to silicon atoms. However, this is not preferred.

Examples of the radicals $OR^1$ are the $C_1$–$C_6$-alkoxy radicals mentioned above for $C_1$–$C_{20}$-hydrocarbon-$C_1$–$C_6$-alkoxysilanes (A1).

Preferably, x has an average value of 0.9 to 1.1. Preferably, y has an average value of 0.4 to 1.2. Preferably, z has an average value of 0.0 to 0.2.

Since the organopolysiloxanes (A2) are branched, they have at least one unit of the general formula (I) in which the sum of x, y and z has the values 0 or 1. Preferably, the organopolysiloxanes (A2) have at least 10 mol %, and in particular at least 30 mol % of units of the general formula (I) in which the sum of x, y and z has the values 0 or 1.

Examples of organosiloxanes (A2) are those which are obtainable by reacting methyltrichlorosilane and optionally a $C_1$–$C_8$-alkyltrichlorosilane or phenyltrichlorosilane with ethanol in water, such as the organopolysiloxanes of the empirical formulae

or

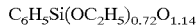

or

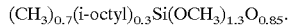

Preferably, the $C_1$–$C_6$-alkoxysilanes (B1) containing aminoalkyl groups have the general formula (II)

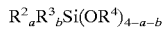   (II), in which
$R^2$ denotes identical or different monovalent, optionally halogen-substituted, SiC-bonded $C_1$–$C_{20}$-hydrocarbon radicals,
$R^3$ denotes identical or different monovalent, optionally halogen-substituted, SiC-bonded aminoalkyl radicals having 1 to 30 carbon atoms,
$R^4$ may be identical or different and denotes hydrogen atom or $C_1$–$C_6$-alkyl radicals,
a is 0, 1 or 2 and
b is 1, 2 or 3,
with the proviso that the sum of a and b is less than or equal to 3.

Examples and preferred examples of the radical $R^2$ are mentioned above in the case of radical R. The methyl radical is particularly preferred.

Radical $R^3$ is preferably a radical of the general formula (III)

   (III), in which
$R^5$ may be identical or different and denotes hydrogen or a monovalent, optionally substituted $C_1$–$C_{10}$-hydrocarbon radical or $C_1$–$C_{10}$-aminohydrocarbon radical and
$R^6$ denotes a divalent $C_1$–$C_{15}$-hydrocarbon radical.

Examples of radical $R^5$ are the examples of hydrocarbon radicals given for radical R and hydrocarbon radicals substituted by amino groups, such as aminoalkyl radicals, the aminoethyl radical being particularly preferred.

Preferably, at least one hydrogen atom is bonded to each nitrogen atom in the radicals of the general formula (III).

Radical $R^6$ is preferably a divalent hydrocarbon radical having 1 to 10 carbon atoms, particularly preferably 1 to 4 carbon atoms, in particular the n-propylene radical.

Examples of radical $R^6$ are the methylene, ethylene, propylene, butylene, cyclohexylene, octadecylene, phenylene and butenylene radicals.

Preferred examples of radicals $R^3$ are
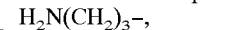
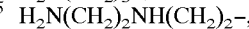
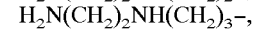
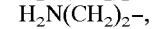
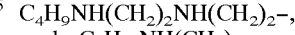
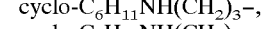
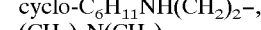
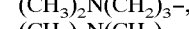
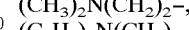
 and
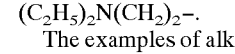.

The examples of alkyl radicals $R^1$ are also fully applicable to the radical $R^6$.

Examples and preferred examples of the radical $R^4$ are mentioned above in the case of radical $R^1$. The methyl and the ethyl radical are particularly preferred.

The branched organosiloxanes (B2) containing aminoalkyl groups are preferably composed of units of the general formula (IV)

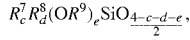   (IV), in which
$R^7$ has the meanings of R,
$R^8$ has the meanings of $R^1$ and $R^9$ has the meanings of $R^1$ and c denotes the values 0 or 1, d denotes the values 0, 1, 2 or 3 and e denotes the values 0, 1, 2 or 3, with the proviso that the sum of c, d and e is not more than 3 and the organopolysiloxanes (B2) have at least one unit of the general formula (IV) in which the sum of c, d and e has the values 0 or 1.

Preferred meanings of $R^7$ are mentioned above for R, and in particular $R^7$ is a methyl radical.

Preferred meanings of $R^8$ are mentioned above for $R^3$, and in particular $R^8$ is an aminopropyl or (aminoethyl) aminopropyl group.

Preferred meanings of $R^9$ are mentioned above for $R^1$, and in particular $R^9$ is a methyl or ethyl radical.

The preferred average value for c is 0 to 1, in particular 0.1 to 0.9.

d preferably denotes the values 0 or 1. The preferred average value for d is 0.1 to 1, in particular 0.2 to 0.8.

e preferably denotes the values 0, 1 or 2. The preferred average value for e is 0.2 to 2, in particular 0.4 to 1.6.

The branched organosiloxanes (B2) containing aminoalkyl groups preferably have a viscosity of 5 $mm^2/s$ to 5000 m/s, in particular of 10 $mm^2/s$ to 3000 $mm^2/s$ at 25° C.

The organosiloxanes (B2) preferably have at least 10 mol %, in particular at least 30 mol %, of units of the general formula (I) in which the sum of a, b and c has the values 0 or 1.

Organosiloxanes (B2) can be prepared in a known manner, for example by equilibration or condensation of silanes having amino functional groups with organopolysiloxanes which contain alkoxy groups and/or hydroxyl groups and which are free of basic nitrogen.

The aqueous emulsion contains emulsifiers (C) known per se.

Particularly suitable anionic emulsifiers are:

1. Alkylsulfates, in particular those having a chain length of 8 to 18 C atoms, alkyl ether sulfates and alkaryl ether sulfates, each having 8 to 18 C atoms in the hydrophobic radical and 1 to 40 ethylene oxide (EO) or propylene oxide (PO) units;
2. Sulfonates, in particular alkylsulfonates having 8 to 18 C atoms, alkylarylsulfonates having 8 to 18 C atoms, taurides, esters and half-esters of sulfosuccinic acid with monohydric alcohols or alkylphenols having 4 to 15 C atoms; these alcohols or alkylphenols may optionally also be ethoxylated with 1 to 40 EO units;
3. Alkali metal and ammonium salts of carboxylic acids having 8 to 20 C atoms in the alkyl, aryl, alkaryl or aralkyl radical; and
4. Partial esters of phosphoric acid and the alkali metal and ammonium salts thereof, in particular alkyl and alkaryl phosphates having 8 to 20 C atoms in the organic radical, alkyl ether or alkaryl ether phosphates having 8 to 20 C atoms in the alkyl or alkaryl radical and 1 to 40 EO units.

Particularly suitable nonionic emulsifiers are:

5. Polyvinyl alcohol which still has 5 to 50%, preferably 8 to 20%, of vinyl acetate units, having a degree of polymerization of 500 to 3000;
6. Alkyl polyglycol ethers, preferably those having 8 to 40 EO units and alkyl radicals of 8 to 20 C atoms;
7. Alkylaryl polyglycol ethers, preferably those having 8 to 40 EO units and 8 to 20 C atoms in the alkyl and aryl radicals;
8. Ethylene oxide/propylene oxide (EO/PO) block copolymers, preferably those having 8 to 40 EO and PO units;
9. Adducts of alkylamines having alkyl radicals of 8 to 22 C atoms with ethylene oxide or propylene oxide;
10. Fatty acids having 6 to 24 C atoms;
11. Alkyl polyglycosides of the general formula $R^*$—O—$Z_o$, in which $R^*$ denotes a linear or branched saturated or unsaturated alkyl radical having on average 8–24 C atoms and $Z_o$ denotes an oligoglycoside radical with on average o=1–10 hexose or pentose units or mixtures thereof;
12. Natural substances and derivatives thereof, such as lecithin, lanolin, saponins, cellulose; cellulose alkyl ethers and carboxyalkyl celluloses whose alkyl groups each have up to 4 carbon atoms; and
13. Linear organo(poly)siloxanes containing polar groups, in particular those organo(poly)siloxanes with alkoxy groups having up to 24 C atoms and/or up to 40 EO and/or PO groups.

Particularly suitable cationic emulsifiers are:

14. Salts of primary, secondary and tertiary fatty amines having 8 to 24 C atoms with acetic acid, sulfuric acid, hydrochloric acid and phosphoric acids;
15. Quaternary alkyl- and alkylbenzeneammonium salts, in particular those whose alkyl groups have 6 to 24 C atoms, in particular the halides, sulfates, phosphates and acetates; and
16. Alkylpyridinium, alkylimidazolinium and alkyloxazolinium salts, in particular those whose alkyl chain has up to 18 C atoms, especially the halides, sulfates, phosphates and acetates.

Particularly suitable ampholytic emulsifiers are:

17. Amino acids substituted by a long-chain radical, such as N-alkyl-di(aminoethyl)glycine or N-alkyl-2-aminopropionic acid salts;
18. Betaines, such as N-(3-acylamidopropyl)-N,N-dimethylammonium salts having a $C_8$–$C_{18}$-acyl radical, and alkylimidazolium betaines.

Preferred emulsifiers (C) are nonionic emulsifiers, in particular the alkyl polyglycol ethers mentioned above under 6., the alkylaryl polyglycol ethers mentioned under 7., the adducts of alkylamines with ethylene oxide or propylene oxide, mentioned under 9., the alkylpolyglycosides mentioned under 11. and the polyvinyl alcohol mentioned above under 5. Particularly preferred are polyvinyl alcohols still containing 5 to 20%, in particular 10 to 15%, of vinyl acetate units and preferably having a degree of polymerization of 500 to 3000, in particular 1200 to 2000.

The total amount of the components (A) and (B) in the aqueous emulsions is preferably 1 to 80% by weight, in particular 5 to 75% by weight.

The ratio of the components (A):(B) in parts by weight in the aqueous emulsions is preferably 200:1 to 5:1, in particular 100:1 to 10:1.

The amount of the emulsifier (C) is preferably 0.1 to 30% by weight, in particular 0.5 to 10% by weight, of the total amount of the components (A) and (B).

The emulsions may furthermore contain solid silicone resins which are composed of monofunctional $R_3SiO_{0.5}$ units and $SiO_2$ (so-called MQ resins), where the molar ratio of the $R_3SiO_{0.5}$ and $SiO_2$ units may be 0.4 to 1.2. R are preferably unsubstituted alkyl radicals, in particular the methyl radical. These MQ radicals result in rapid formation of the hydrophobic character in particular in the case of very highly absorptive building materials. If such silicone resins are used in the emulsions, their amount is preferably not more than 10% by weight, in particular not more than 5% by weight, based on the total amount of the components (A) and (B).

Furthermore, the emulsion may also contain organic polymers, such as, for example, fluorine-containing polymers and polyolefin waxes, in addition to the components (A), (B) and (C). Instead of the polyolefin waxes, silicone waxes may also be used.

These polymers impart particular properties to the emulsions according to the invention. With the fluorine-containing polymers, such as, for example, fluorinated acrylates or polyurethanes, the emulsions not only have a water repellent effect but also an oil-repellent effect. Polyolefin and silicone waxes influence the appearance of the building material surfaces treated with the emulsions, in such a way that they produce a certain deepening of color or a specific surface gloss. If such organic polymers or waxes are used in the emulsions, their amount is preferably not more than 10% by weight, in particular not more than 5% by weight, based on the total amount of the components (A) and (B).

The emulsions may additionally contain customary fillers and thickeners, in particular reinforcing fillers, i.e. fillers having a BET surface area of more than 50 m$^2$/g, such as silica prepared by a pyrogenic method, precipitated silica and mixed silicon-aluminum oxides having a large BET surface area. Finely divided silica is particularly suitable. It is possible to use one type of filler as well as a mixture of at least two fillers. The amount of fillers is preferably not more than 5% by weight, and in particular not more than 2% by weight of the total amount of the components (A) and (B).

The emulsions may also contain buffer substances which stabilize the pH in the range from 5 to 9, in which the alkyltrialkoxysilanes are very stable to hydrolysis. All organic and inorganic acids and bases which are chemically inert with respect to the other components of the emulsions are suitable, in particular the alkali metal, alkaline earth metal and ammonium salts of carboxylic acids, phosphoric acid, carbonic acid and sulfuric acid. Sodium carbonate, sodium bicarbonate, sodium hydrogen phosphate and a mixture of acetic acid and aqueous ammonia solution are particularly preferred. The amount of buffer substances is preferably not more than 3 weight percent, in particular not more than 1 weight percent of the total amount of the components (A) and (B).

In addition to the components described above, the emulsions may contain fungicides, bactericides, algicides, microbicides, odor substances, corrosion inhibitors and antifoams as additives. The preferred amount of additives is not more than 2 weight percent, in particular not more than 0.5 weight percent of the total amount of the components (A) and (B).

The aqueous emulsions according to the invention are prepared by conventional processes for the preparation of aqueous emulsions. Preferably, first only a part of the water is mixed with emulsifier (C), the component (B) is then added and finally the component (A) is incorporated into the emulsion until a viscous oil phase ("stiff phase") forms, and then the remaining water is incorporated to form a less viscous emulsion. The components (A) and (B) may also be mixed and added to an emulsion comprising emulsifier and water. The mixing is preferably carried out in pressure emulsification machines or colloid mills and in particular in high-speed stator-rotor stirring apparatus according to Prof. P. Willems.

The invention also relates to a process for imparting water repellency to porous mineral building materials and building coatings and to wood, in which the building materials, building coatings and the wood are treated with the above aqueous emulsion. The treatment also comprises the addition to materials which are processed to give building materials and building coatings.

The emulsions are suitable for imparting water repellency to mineral building materials such as natural or artificial stone, concrete, cement, lime sandstone and porous concrete; building materials comprising clay minerals such as bricks; and wood; and as an additive acting as water repellent and optionally as a binder, to plaster, renders, and building coatings such as mineral paints, silicone resin emulsion paints and renders, silicate emulsion paints, emulsion paints, brushable fillers, reinforcing materials, and primers.

The emulsions are also suitable for imparting water repellency to finely divided inorganic substances, such as perlite, vermiculite and heat insulating materials.

Emulsions which have both alkoxysilanes (A1) and organosiloxanes (A2) preferably in the ratio alkoxysilanes (A1): organosiloxanes (A2) of 0.5:1 to 20:1, in particular 1:1 to 10:1, are preferably used for imparting water repellency to highly absorptive mineral building materials and building coatings.

The emulsions are particularly suitable for imparting water repellency to mineral-bound, preferably cement-bound fibrous building materials whose fibers consist of natural fibers or synthetic fibers. Suitable natural fibers are mineral fibers, such as rockwool, quartz fibers, or ceramic fibers; or plant fibers, such as cellulose. Suitable synthetic fibers are, for example, glass fibers, plastics fibers and carbon fibers. The use of the emulsion for imparting water repellency to cement-bound cellulose fiber components is particularly preferred. The cellulose fibers may be, for example, jute, coconut or hemp fibers or may originate from paper, cardboard or waste paper.

The emulsions are suitable for use in the bulk material, i.e. the emulsion is added to a hydraulic mixture for the production of components prior to setting, or for imparting water repellency to components after setting.

Before they are used as water repellents and optionally binders, the emulsions according to the invention can be diluted with water. In the case of the surface impregnation of building materials after setting, dilution up to a total content of the components (A) and (B) of 1% by weight is advantageous.

In the following examples, all stated parts and percentages relate to weight, unless stated otherwise. Unless stated otherwise, the examples below are carried out at a pressure of the surrounding atmosphere, i.e. at about 0.10 MPa, and at room temperature, i.e. at about 20° C., or at a temperature which is established on combining the reactants at room temperature without additional heating or cooling. All viscosity data mentioned in the examples relate to a temperature of 25° C. The solids content of the emulsions denotes the sum of all components, with the exception of water.

EXAMPLES

The following are used as component (A):

H1: isooctyltriethoxysilane

H2: organopolysiloxane of the empirical formula $CH_3Si(OC_2H_5)_{0.8}O_{1.1}$ having an average molecular weight of about 650 g/mol and a viscosity of about 20 mm$^2$/s H3: methylsilicone resin present as a highly viscous liquid and comprising $CH_3SiO_{3/2}$ units, with about 20 mol % of $(CH_3)_2SiO_{2/2}$ units and about 10 mol % of $C_2H_5OSiO_{3/2}$ units and a molecular weight of about 5000 g/mol H4: methylsilicone resin present in powder form and comprising $CH_3SiO_{3/2}$ units, with about 3 mol % of $(CH_3)_2SiO_{2/2}$ units and about 4 mol % of $C_2H_5OSiO_{3/2}$ units, a molecular weight of about 5000 g/mol and a softening point of about 50° C.

H5: organopolysiloxane of the empirical formula $(CH_3)_{0.7}(isooctyl)_{0.3}Si(OCH_3)_{1.3}O_{0.85}$, having an average molecular weight of about 760 g/mol and a viscosity of about 17 mm$^2$/s The following are used as component (B):

N1: N-(2-aminoethyl)-3-aminopropyltrimethoxysilane

N2: condensate of H2 and N-(2-aminoethyl)-3-aminopropyltrimethoxysilane in the presence of KOH with an amine number of about 3.0, a viscosity of about 500 mm$^2$/s at 25° C. and a residual methoxy content of less than 5 mol %, based on the methoxy groups initially present in the N-(2-aminoethyl)-3-aminopropyltrimethoxysilane The following are used as component (C):

E1: Arlypon® IT 16 from Chemische Fabrik Grünau GmbH, Illertissen, an isotridecyl alcohol-(16)-polyglycol ether E2: Polyviol® W 25/140 from Wacker-Chemie GmbH, Munich, a polyvinyl alcohol having a degree of polymerization of about 1600 and still having 11–14% of acetoxyethylene units Preparation of the Emulsions The aqueous emulsions according to the invention are prepared by first mixing some of the water with emulsifier (component (C)) and emulsifying silane or siloxane having amino functional groups (component (B)), followed by silane and/or polysiloxane (component (A)). Both the first-mentioned mixing and the emulsification are carried out in a high-speed rotor-stator stirring apparatus from Prof. P. Willems. The compositions are shown below in Table I. The comparative emulsions are prepared in an analogous manner. The compositions are likewise shown in Table I.

TABLE 1

| Emulsion | Silane/siloxane component (A) | Aminosilane/aminosiloxane component (B) | Emulsifier (C) | Water |
|---|---|---|---|---|
| Emulsions according to the invention | | | | |
| EM1 | 66.5% H1 | 2% N1 | 2.6% E1 | 29.7% |
| EM2 | 34.1% H1<br>12.3% H2 | 2% N1 | 1.8% E1 | 49.8% |
| EM3 | 43.4% H1 | 6.8% N2 | 1.8% E1 | 48.0% |
| EM4 | 40.0% H1<br>10.0% H5 | 0.5% N1 | 2.2% E1 | 47.7% |
| EM5 | 39% H1<br>5.8% H2<br>3.7% H4 | 2.7% N2 | 1.8% E1 | 47.0% |
| EM6 | 40.2% H1<br>6.9% H2<br>2.0% MQ resin* | 0.5% N1 | 2.2% E1 | 48.2% |
| EM7 | 9.2% H1<br>36.1% H3 | 4.9% N1 | 3.7% E2 | 46.1% |
| Comparative emulsions | | | | |
| EM8 | 47.8% H1 | — | 2.2% E1 | 50.0% |
| EM9 | 36.1% H1<br>12.3% H2 | — | 1.8% E1 | 49.8% |

TABLE 1-continued

| Emulsion | Silane/siloxane component (A) | Aminosilane/aminosiloxane component (B) | Emulsifier (C) | Water |
|---|---|---|---|---|
| EM10 | 39.2% H1<br>8.8% H2<br>0.9% filler** | — | 2.2% E1 | 48.9% |
| EM11 | 63.5% H1 | 5.0% aminosiloxane*** | 2.6% E1 | 28.9% |

*MQ resin: solid consisting of $Me_3SiO_{0.5}$ and $SiO_2$ units in the ratio 1:1
**finely divided silica having a specific surface area of about 150 m$^2$/g
***condensate of α,ω-dihydroxypolydimethylsiloxane and N-(2-aminoethyl)-3-aminopropyltrimethoxy-silane, having a viscosity of about 1500 mm$^2$/s (at 25° C.) and an amine number of about 0.6

None of the emulsions shows any phase separation either after storage for 14 days at 50° C. or after 6 months at room temperature. They therefore have a long shelf life. The same applies to dilutions prepared therefrom and having active ingredient contents of 25 to 5%. At even lower concentrations, i.e. for example 1% active ingredient content, slight creaming may occur but no proper phase separation takes place.

Example 1

Imparting Water Repellency to Mineral Coatings

Emulsions according to the invention and not according to the invention are diluted with water to 10% active ingredient content and then applied with a brush to lime sandstone coated with mineral paint (silicate paint Purkristallat® from Keim-Farben GmbH, Diedorf) (amount applied about 450 g/m$^2$). After storage for 14 days at room temperature, the discoloration and the water repellency of water dripped on the coated lime sandstones rendered water repellent are assessed by measuring the contact angle. Contact angles of >90° denote good water repellency and those of <90° denote wetting and therefore tend to represent poor water repellency. The results are listed in Table II below.

TABLE II

| Emulsion | Discoloration | Water repellency | Contact angle |
|---|---|---|---|
| EM 1 | none | good | 110° |
| EM 2 | none | very good | 130° |
| EM 3 | very slight | very good | 125° |
| EM 4 | none | very good | 140° |
| EM 5 | slight | very good | 140° |
| EM 6 | slight | very good | 140° |
| EM 8 | none | poor | 30° |
| EM 9 | none | moderate | 70° |
| EM 10 | white spots | very good | 135° |
| EM 11 | strong | very good | 130° |

As is evident from Table II, the emulsions according to the invention do not discolor the substrate and produce outstanding water repellency. Slight discoloration of the substrate in this test is equivalent to good penetration behavior of the relevant products. The comparative emulsions EM 8 to EM 10 penetrate well but white spots are found on dark silicate paint in the case of EM 10. Owing to the lack of an amine component, the water repellency of the comparative emulsions EM 8 and EM 9 is substantially poorer than that of the emulsions according to the invention. In the case of EM 11, the aminosiloxane has good water repellency but also leads to a dramatic darkening of the coated lime sandstone.

Example 2

Imparting Water Repellency to Uncoated Lime Sandstone

Emulsions according to the invention and not according to the invention are diluted with water to the active ingredient contents stated in Table III. Lime sandstone plaques (about 10×10×2.5 cm$^3$) are then immersed therein for 5 minutes (about 5 cm liquid cover). After storage for 14 days at room temperature, the test specimens treated in this manner and untreated reference test specimens are placed in water (5 cm water cover) and their water absorption is determined as relative weight increase after 24 hours. The test specimens are then dried and broken and the thickness of the hydrophobic zone (equal to the depth of penetration of the active ingredients imparting water repellency) is determined by dripping water onto the fracture surface. The water repellency is characterized, as in Example 1, by measuring the contact angle. The results of these experiments are summarized in Table III.

TABLE III

| Emulsion | Active Ingredient Content | Water Absorption | Depth of Penetration | Water Repellency | Contact Angle |
|---|---|---|---|---|---|
| EM 1 | 5% | 2.5% | 1.5–2.5 mm | good | 110° |
|  | 10% | 1.2% | 2–4 mm | good | 105° |
| EM 2 | 5% | 1.4% | 1–2 mm | good | 115° |
|  | 10% | 0.6% | 1.5–3 mm | very good | 125° |
| EM 4 | 5% | 1.1% | 1–2 mm | very good | 130° |
|  | 10% | 0.5% | 2–3 mm | very good | 130° |
| EM 6 | 5% | 1.3% | 1–2 mm | very good | 135° |
|  | 10% | 0.7% | 2.5–3 mm | very good | 140° |
| EM 8 | 5% | 7.5% | 1–3 mm | poor | 30° |
|  | 10% | 4.1% | 2–4 mm | poor | 25° |
| EM 9 | 5% | 6.7% | 1–2 mm | poor | 60° |
|  | 10% | 3.5% | 2–3 mm | moderate | 50° |
| EM 10 | 5% | 5.2% | 0.5–1.5 mm | good | 120° |
|  | 10% | 3.4% | 1.5–3 mm | very good | 140° |
| EM 11 | 5% | 2.7% | 0–0.5 mm | good | 115° |
|  | 10% | 0.9% | 0.5–1 mm | very good | 130° |
| Untreated | — | 12.3% | — | — | — |

It is evident from Table III that the emulsions according to the invention give significantly better water repellency than the comparative emulsions EM 8 and EM 9. The component having functional amino groups thus has, even in very low concentration, such as, for example, in EM 4, a substantial effect on the adhesion of the silicone resins to the surface or to that region of the substrate which is close to the surface.

In a similar manner, the water absorption of the lime sandstones treated with the emulsions according to the invention is advantageously affected, i.e. reduced. In the case of the comparative emulsions EM 8 to EM 10, the water absorption is high even two weeks after the application. In the case of EM 11, water repellency and water absorption are comparable with the emulsions according to the invention but the depth of penetration is small. A small depth of penetration is undesired since it reduces the long-term stability of a water repellent treatment exposed to weathering. EM 10 gives good water repellency comparable with that of the emulsions according to the invention but the initially large contact angle of water dripped on rapidly decreases until wetting occurs. In the water absorption test, this effect is evident from the fact that the pale lime sandstones appear dark and wet after only a short time in water. This undesired effect does not occur in the case of the emulsions according to the invention; the stones do not change their appearance even after storage in water for 24 hours.

Example 3

Imparting water repellency to clay bricks

Emulsions according to the invention and not according to the invention are diluted with water to 10% active ingredient content. Clay bricks (about 22×10×7 cm$^3$) are then immersed therein for 1 minute (about 5 cm liquid cover). After a drying time of 14 days, water absorption, water repellency or contact angle and depth of penetration are determined analogously to Example 2. The results of these investigations are summarized in Table IV.

TABLE IV

| Emulsion | Water Absorption | Depth of Penetration | Water Repellency | Contact Angle |
|---|---|---|---|---|
| EM 1 | 1.4% | 15–20 mm | moderate | 75° |
| EM 2 | 0.8%% | 12–17 mm | good | 110° |
| EM 4 | 0.3% | 10–15 mm | very good | 125° |
| EM 8 | 4.8% | 14–20 mm | none | 10° |
| EM 9 | 3.5% | 11–14 mm | poor | 30° |
| EM 11 | 0.5% | 8–12 mm | good | 110° |
| untreated | 17.6% | — | — | — |

Only those emulsions according to the invention which also contain a siloxane component in addition to silane, i.e. for example EM 2 and EM 4, give very good water repellency on the highly absorptive clay bricks, whereas the purely silane-containing EM 1 does not. However, a comparison of EM 1, EM 2 and EM 4 with EM 8 and EM 9 shows how the amino component advantageously influences both the water repellency and the water absorption. A particularly good performance is produced by EM 4 which, in addition to ethoxysilane, also contains siloxane having methoxy functional groups, which react substantially more rapidly than comparable components having ethoxy functional groups. Owing to its aminosiloxane content, EM 11 also gives good results but penetrates rather more poorly than the other emulsions and darkens the stone surface.

Example 4

Imparting water repellency to concrete

The assessment of the quality of water repellants for concrete impregnation is carried out according to the technical testing specifications for surface protection systems of ZTV-SIB 90 of the Bundesministerium für Verkehr, [Federal German Ministry for Traffic], Bonn. The water absorption and stability in an alkaline environment are tested using mortar disks, which are produced according to DIN EN 196 T1 (water/cement ratio 0.5). The disks have a diameter of 10 cm and a height of 2 cm. Before the test, the test specimens must have been stored for at least 90 days under standard climatic conditions (DIN 50 014, 23° C./50% relative humidity). The test is carried out according to the following scheme:
  Production of 10 mortar disks
    Age of the mortar disks min. 90 days; storage under standard climatic conditions according to DIN 50014 23/50-2 (Standard climatic weight I) before the beginning of the test
  Brushing with coarse scrubbing brush, storage for 28 days in demineralized water, determination of water absorption (WA)
    Selection of 5 mortar disks which come closest to the mean value of the WA of the 10 mortar disks
  Storage in the drying oven at 75° C. until the standard climatic weight I is reached
    Storage for 3 days in a standard climate according to DIN 50014-23/50-2
  Storage in water for 2 min
    Storage for 24 hours at 23/95, storage for 2 hours in a standard climate according to DIN 50014-23/50-2

Imparting of water repellency by immersion for 1 min.

Determination of the absorption of impregnating agent

Storage for 14 days in a standard climate according to DIN 50014-23/50-2

Storage for 48 hours in 0.1 M KOH solution, determination of the amount of liquid absorbed Storage in a drying oven at 75° C. until the standard climatic weight I is reached Storage for 3 days in a standard climate according to DIN 50014-23/50-2

Determination of the water absorption (2 days, 28 days)

Drying for 24 hours at 75° C.

Determination of the depth of penetration

A water repellant is classified as suitable for imparting water repellency to concrete if the water absorption on storage in water for 28 days is reduced by at least 50%. Furthermore, the effect of the emulsions according to the invention with regard to increasing the resistance to freezing and deicing salt according to the technical testing specifications for surface protection systems of ZTV-SIB 90 was investigated. For this purpose, concrete cubes (10 cm edge length) of strength class B 25 according to DIN 1045 (water/cement ratio 0.6) were produced as test specimens. Before the test, the test specimens were stored for at least 90 days in a standard climate (DIN 50 014, 23° C./50% relative humidity). The cubes are impregnated by complete immersion in the water repellent emulsion for a duration of one minute. Thereafter, the test specimens are stored for 14 days in a standard climate (DIN 50 014, 23° C./50% relative humidity). Thereafter, the concrete cubes are immersed for 24 hours in 3% strength NaCl solution and then subjected to the freezing and thawing cycles (1 cycle comprises storage for 16 hours at −15° C. and thawing for 8 hours to +20° C.). After 5 cycles in each case, the mass of the test specimens is determined and the relative mass loss is calculated. A water repellant meets the requirements if the concrete cubes impregnated therewith withstand 15 cycles more than untreated reference test specimens without suffering damage.

All emulsions used for the experiments were diluted to 20% active ingredient content.

The results of the test for water absorption and stability in an alkaline environment are summarized in Table V and the resistance to freezing and deicing salt is summarized in Table VI.

TABLE V

| Emulsion | Absorption of Impregnating Agent | Water Absorption | Depth of Penetration |
|---|---|---|---|
| EM 1 | 129 g/m² | 2.3% | 2–4 mm |
| EM 2 | 121 g/m² | 2.7% | 1.5–3 mm |
| EM 11 | 103 g/m² | 3.9% | 0.5–2 mm |
| untreated | — | 5.7% | — |

TABLE VI

| Emulsion | Absorption of Impregnating Agent | Relative change in mass | | | | |
|---|---|---|---|---|---|---|
| | | Preliminary storage | 1 Cycle | 5 Cycles | 10 Cycles | 15 Cycles |
| EM 1 | 175 g/m² | +0.5% | +2.0% | +4.2% | +4.5% | +2.1% |
| EM 2 | 161 g/m² | +1.2% | +3.1% | +4.4% | +2.7% | +0.5% |

TABLE VI-continued

| Emulsion | Absorption of Impregnating Agent | Relative change in mass | | | | |
|---|---|---|---|---|---|---|
| | | Preliminary storage | 1 Cycle | 5 Cycles | 10 Cycles | 15 Cycles |
| EM 11 | 148 g/m² | +1.6% | +2.2% | +3.5% | +0.9% | −4.7% |
| untreated | — | +2.7% | +3.4% | −1.1% | −4.5% | −17.5% |

As is evident from Tables V and VI, the emulsions EM 1 and EM 2 according to the invention show outstanding penetration into the concrete, which is a precondition for fulfilling the criteria of water absorption (less than 50%, based on untreated) and resistance to alternate freezing and thawing (at least 15 cycles without suffering damage). In the case of the comparative emulsion EM 11, the aminofunctional polydimethylsiloxane interferes with the penetration to such an extent that the criteria with regard to water absorption and resistance to freezing and deicing salt are not fulfilled.

Example 5

Imparting Water Repellency to Wood

Sprucewood boards (15×7.5×0.5 cm³) are immersed for three minutes in the water repellent emulsions. The test specimens are then dried for 14 days at room temperature, and the capillary water absorption is then determined in a so-called floating test. For this purpose, the boards are floated on water on each of the two flat sides for 15 minutes, and the weight increase is recorded. The test specimens are then weathered in an accelerated weathering apparatus (model QUV/se from Q-Panel Lab Products, Cleveland, Ohio 44145, USA) for 2000 hours. The weathering cycle is adjusted so that exposure to UV(B) radiation is carried out for 8 hours, spraying is then carried out for 10 minutes and condensation is then effected for 4 h in moisture-saturated air at a temperature of 50° C. Thereafter, spraying is again carried out for 10 minutes and the next cycle is started with exposure to radiation.

After the weathering, the test specimens are dried for one week at room temperature and again subjected to the floating test described above. In addition, the water repellency of the wood is qualitatively assessed. The results are summarized in Table VII.

TABLE VII

| Emulsion | Active Ingredient Content | Before Weathering | | After Weathering | |
|---|---|---|---|---|---|
| | | water absorption | water repellency | water absorption | water repellency |
| EM 4 | 5% | 11% | moderate | 6% | good |
| | 10% | 8% | moderate | 4% | good |
| EM 4 + wax* | 5% | 7% | very good | 3% | very good |
| | 10% | 4.5% | very good | 1.5% | very good |
| EM 7 | 5% | 4% | very good | 2.5% | very good |
| | 10% | 2% | very good | 1.5% | very good |
| EM 8 | 5% | 17% | poor | 14% | average |
| | 10% | 13% | poor | 9.5% | moderate |
| untreated | — | 21% | none | 27% | none |

*9 parts by weight of the emulsion EM 4 were mixed with 1 part by weight of a 35% strength emulsion of a silicone wax. The active ingredient content of the wax is taken into account in the total active ingredient content in column 2 of Table VII.

From the results in Table VII, it may be concluded that in particular the emulsions EM 4 and EM 7 give good results on wood whereas the comparative emulsion EM 8 performs rather moderately. The reason for this is that, on the substantially neutral substrate wood, an emulsion EM 8 consisting only of silane reacts extremely slowly to give the actual active ingredient, the silicone resin. A not inconsiderable part of the generally volatile silane will consequently evaporate, which is reflected in a poor reduction of the water absorption. EM 7 predominantly comprises the less reactive resin H3, which rapidly produces good water repellency on the surface of the wood. In the case of EM 4, the siloxane component results in good early water resistance which however can still be considerably improved by suitable silicone wax (EM 4+wax). In contrast to conventional organic polymer waxes, the silicone wax used is weather-resistant and has a long life.

Example 6

Water Repellent Primers for Mineral Coatings on Mineral Building Materials a) Emulsion EM 2 diluted to a solids content of 10% by weight is applied in 400 g/m² to lime sandstone. After storage for 14 days at room temperature, the following properties of the lime sandstone which has been rendered water repellent are measured:

Water repellency: very good

Contact angle: 130°

Depth of penetration: 3 mm w value: 0.073 kg/m² sd value: 0.02 m

The water absorption is evaluated by measuring the water absorption coefficient w according to DIN 52617. Values of w<0.1 kg/m² denote an extremely low water absorption.

The sd value is measured according to DIN 52615; sd values<0.1 m indicate high water vapor permeability, sd values>0.1 m indicate low water vapor permeabilities.

The lime sandstone stored for 14 days is coated with silicone resin emulsion paint according to DIN 18363 (the content of organic resins does not exceed the content of organopolysiloxanes). The adhesive strength of the coating according to ISO 4624 is determined as 2.8 N/mm². Without the water repellent priming with 10% strength emulsion EM 2, the adhesion of this silicone resin paint to lime sandstone is determined only as 1.5 N/mm².

b) Emulsion EM 3 diluted to a solids content of 10% by weight is stored for 14 days at 50° C., after which it shows no visual change. Thereafter, this dilute emulsion is applied by means of a brush to a fiber cement slab coated 2 mm thick with brittle lime-cement render and then stored for 14 days at room temperature.

In the case of untreated lime-cement render, a w value of 1.3 kg/m² is found.

The following properties of the lime-cement render made water repellent in this manner are found:

water repellency: very good contact angle: 125° depth of penetration: 2 mm w value: 0.068 kg/m²

What is striking is the improved surface strength of the lime-cement render after application of 10% strength EM 3.

The substrate treated in this manner can be coated with silicone resin emulsion paints. All preparations coated in this manner exhibit, after Q-UV accelerated weathering for 1000 h, absolutely no flaking or color changes while retaining very good water repellency.

Example 7

Water Repellent Additive for Aqueous Masonry Paints and Renders Having a High Filler Content Masonry paints which have a high filler content and high capillary water absorption and tend to have a low binder content, such as emulsion silicate paints and renders, emulsion-based coatings having a high filler content, emulsion lime paints, brushable fillers and reinforcing materials, mineral paints, mineral renders, lime paints, etc., are considered here. The pigment volume concentration (PVC.) of the coatings is typically above 50%. Usually, the water absorption of the abovementioned coating materials is at least 3 kg/m² after 24 hours, determined by the accelerated test described below.

The addition of only 1% of the undiluted emulsions according to the invention as water repellent additive to the coating materials shown below in Table VIII dramatically reduces this capillary water absorption. The water absorption is determined after the accelerated test described below.

The suction effect of lime sandstone or that of the composite lime sandstone/coating system is measured. The measurement of the capillary water absorption is described in DIN 52617. The procedure used here is performed as an accelerated test based on the above method. The paint substrates used are lime sandstone panels (115×70×20 mm with a surface area of 0.008 m²). During coating of the paint substrates, 6.5 g are poured onto the surface as a first coat and distributed uniformly with a flat brush, the lateral surfaces also being coated. The second coat is applied after 24 hours. The amount of paint applied is 4.5 g. The coated test specimens are stored for 24 hours at room temperature and then for 24 hours at 50° C. For further conditioning, storage is carried out for an additional 24 hours at room temperature.

The test specimens prepared in this manner are introduced into dishes which are lined with foam and filled with water, so that the coated surface remains constantly in contact with the water-saturated foam surface. The weight increase is measured as a function of time (after 2, 6 and 24 hours) and is compared with that of the untreated test specimen.

TABLE VIII

| Coating material | Water absorption [kg/m²] | Addition 1% by weight each |
|---|---|---|
| Emulsion silicate paint | 6.4 | — |
|  | 0.28 | EM 3 |
| Pit lime render | 7.4 | — |
|  | 0.35 | EM 4 |
| Filler-containing emulsion paint (PVC 70) | 3.4 | — |
|  | 0.62 | EM 2 |

Example 8

Water Repellent Additive for Mortar Mixtures

A mixture of 1350 g of sand and 450 g of Portland cement is stirred with a mixture of 225 g of water and 5.2 g of emulsion (one experiment with EM 1, and a second experiment with EM 11) to give a mortar. This is then introduced into polytetrafluoroethylene rings having a diameter of 10 cm and a height of 2 cm. After a drying time of 4 weeks, the rings are removed from the samples of the latter and are placed 5 cm deep in water for 28 days, and the water absorption is determined gravimetrically.

In addition, the mortar mixtures are poured into rectangular polytetrafluoroethylene molds having the dimensions 15 cm (length)×4 cm (width)×4 cm (height). After a setting time of, likewise, 4 weeks, the test specimens are removed from the mold and used for determining compressive strength and bending strength.

The results of the water absorption and compressive strength and bending strength are summarized in Table IX below.

TABLE IX

| Emulsion | Water absorption | Compressive strength | Bending strength |
|----------|------------------|---------------------|------------------|
| EM 1     | 2.2%             | 41 N/mm$^2$         | 7.8 N/mm$^2$     |
| EM 11    | 2.4%             | 28 N/mm$^2$         | 6.0 N/mm$^2$     |
| untreated| 5.5%             | 43 N/mm$^2$         | 7.6 N/mm$^2$     |

It is evident from Table IX that both the emulsion EM 1 according to the invention and the comparative emulsion EM 11 significantly reduce the water absorption of the mortar samples. In contrast to EM 1, however, EM 11, owing to its polydimethylsiloxane content, impairs the mechanical properties of compressive strength and bending strength to a considerable extent, whereas they remain virtually unchanged as a result of the addition of EM 1.

What is claimed is:

1. An aqueous emulsion containing organosilicon compounds useful for imparting water repellancy which contains an emulsifier, wherein said organosilicon compounds consist essentially of
    (A) organosilicon compounds which are selected from
        (A1) $C_1$–$C_{20}$-hydrocarbon-$C_1$–$C_6$-alkoxysilanes,
        (A2) branched organopolysiloxanes containing $C_1$–$C_6$-alkoxy groups, or mixtures thereof;
    (B) organosilicon compounds which are selected from
        (B1) $C_1$–$C_6$-alkoxysilanes containing aminoalkyl groups,
        (B2) branched organosiloxanes containing aminoalkyl groups; or mixtures thereof; and
    (C) optionally a silicone resin, a silicone wax, or mixture thereof.

2. The aqueous emulsion as claimed in claim 1, wherein the $C_1$–$C_{20}$-hydrocarbon-$C_1$–$C_6$-alkoxysilanes (A1) have 1 or 2 identical or different, optionally halogen-substituted, monovalent $C_{1-20}$-hydrocarbon radicals bonded via SiC, and the other radicals are identical or different $C_1$–$C_6$-alkoxy radicals.

3. The aqueous emulsion as claimed in claim 1, wherein the organopolysiloxanes (A2) are composed of units of the general formula (I)

   (I)

in which
    R is an identical or different monovalent optionally halogen-substituted $C_1$–$C_{20}$-hydrocarbon radical bonded via SiC,
    $R^1$ is an identical or different monovalent $C_1$–$C_6$-alkyl radical,
    x is 0, 1, 2 or 3, on average 0.8 to 1.8,
    y is 0, 1, 2 or 3, on average 0.01 to 2.0, and
    z is 0, 1, 2 or 3, on average 0.0 to 0.5, with the proviso that the sum of x, y and z is on average not more than 3.5, the organopolysiloxanes (A2) having at least one unit of the general formula (I) in which the sum of x, y and z has the values 0 or 1.

4. The aqueous emulsion as claimed in claim 2, wherein the organopolysiloxanes (A2) are composed of units of the general formula (I)

   (I)

in which
    R is an identical or different monovalent optionally halogen-substituted $C_1$–$C_{20}$-hydrocarbon radical bonded via SiC,
    $R^1$ is an identical or different monovalent $C_1$–$C_6$-alkyl radical,
    x is 0, 1, 2 or 3, on average 0.8 to 1.8,
    y is 0, 1, 2 or 3, on average 0.01 to 2.0, and
    z is 0, 1, 2 or 3, on average 0.0 to 0.5, with the proviso that the sum of x, y and z is on average not more than 3.5, the organopolysiloxanes (A2) having at least one unit of the general formula (I) in which the sum of x, y and z has the values 0 or 1.

5. The aqueous emulsion as claimed in claim 1, wherein the $C_1$–$C_6$-alkoxysilanes (B1) containing aminoalkyl groups have the general formula (II)

   (II), in which
    $R^2$ is an identical or different monovalent, optionally halogen-substituted, SiC-bonded $C_{1-20}$-hydrocarbon radical,
    $R^3$ is an identical or different monovalent, optionally halogen-substituted, SiC-bonded aminoalkyl radicals having 1 to 30 carbon atoms,
    $R^4$ is identical or different and is a hydrogen atom or a $C_1$–$C_6$-alkyl radical,
    a is 0, 1 or 2 and
    b is 1, 2 or 3,
with the proviso that the sum of a and b is less than or equal to 3.

6. The aqueous emulsion as claimed in claim 2, wherein the $C_1$–$C_6$-alkoxysilanes (B1) containing aminoalkyl groups have the general formula (II)

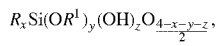   (II), in which
    $R^2$ is an identical or different monovalent, optionally halogen-substituted, SiC-bonded $C_1$–$C_{20}$-hydrocarbon radical,
    $R^3$ is an identical or different monovalent, optionally halogen-substituted, SiC-bonded aminoalkyl radicals having 1 to 30 carbon atoms,
    $R^4$ is identical or different and is a hydrogen atom or a $C_1$–$C_6$-alkyl radical,
    a is 0, 1 or 2 and
    b is 1, 2 or 3,
with the proviso that the sum of a and b is less than or equal to 3.

7. The aqueous emulsion as claimed in claim 3, wherein the $C_1$–$C_6$-alkoxysilanes (B1) containing aminoalkyl groups have the general formula (II)

   (II), in which
- $R^2$ is an identical or different monovalent, optionally halogen-substituted, SiC-bonded $C_1$–$C_{20}$-hydrocarbon radical,
- $R^3$ is an identical or different monovalent, optionally halogen-substituted, SiC-bonded aminoalkyl radicals having 1 to 30 carbon atoms,
- $R^4$ is identical or different and is a hydrogen atom or a $C_1$–$C_6$-alkyl radical,
- a is 0, 1 or 2 and
- b is 1, 2 or 3, with the proviso that the sum of a and b is less than or equal to 3.

8. The aqueous emulsion as claimed in claim 4, wherein the $C_1$–$C_6$-alkoxysilanes (B1) containing aminoalkyl groups have the general formula (II)

$$R^2_a R^3_b Si(OR^4)_{4-a-b} \tag{II},$$

in which
- $R^2$ is an identical or different monovalent, optionally halogen-substituted, SiC-bonded $C_1$–$C_{20}$-hydrocarbon radical,
- $R^3$ is an identical or different monovalent, optionally halogen-substituted, SiC-bonded aminoalkyl radicals having 1 to 30 carbon atoms,
- $R^4$ is identical or different and is a hydrogen atom or a $C_1$–$C_6$-alkyl radical,
- a is 0, 1 or 2 and
- b is 1, 2 or 3, with the proviso that the sum of a and b is less than or equal to 3.

9. The aqueous emulsion as claimed in claim 1, wherein the branched organosiloxanes (B2) containing aminoalkyl groups are composed of units of the general formula (IV)

$$R^7_c R^8_d (OR^9)_e SiO_{\frac{4-c-d-e}{2}}, \tag{IV}$$

in which
- $R^7$ is an identical or different monovalent optionally halogen-substituted $C_1$–$C_{20}$-hydrocarbon radical bonded via SiC,
- $R^8$ is an identical or different monovalent, optionally halogen-substituted, SiC-bonded aminoalkyl radical having 1 to 30 carbon atoms,
- $R^9$ is an identical or different monovalent $C_1$–$C_6$-alkyl radical,
- c is 0 or 1,
- d is 0, 1, 2 or 3, and
- e is 0, 1, 2 or 3, with the proviso that the sum of c, d and e is not more than 3 and the organopolysiloxanes (B2) have at least one unit of the general formula (IV) in which the sum of c, d and e has the values 0 or 1.

10. The aqueous emulsion as claimed in claim 2, wherein the branched organosiloxanes (B2) containing aminoalkyl groups are composed of units of the general formula (IV)

$$R^7_c R^8_d (OR^9)_e SiO_{\frac{4-c-d-e}{2}}, \tag{IV}$$

in which
- $R^7$ has the meanings of R,
- $R^8$ has the meanings of $R^3$,
- $R^9$ has the meanings of $R^1$,
- c is 0 or 1,
- d is 0, 1, 2 or 3, and
- e is 0, 1, 2 or 3, with the proviso that the sum of c, d and e is not more than 3 and the organopolysiloxanes (B2) have at least one unit of the general formula (IV) in which the sum of c, d and e has the values 0 or 1.

11. The aqueous emulsion as claimed in claim 3, wherein the branched organosiloxanes (B2) containing aminoalkyl groups are composed of units of the general formula (IV)

$$R^7_c R^8_d (OR^9)_e SiO_{\frac{4-c-d-e}{2}}, \tag{IV}$$

in which
- $R^7$ is an identical or different monovalent optionally halogen-substituted $C_1$–$C_{20}$-hydrocarbon radical bonded via SiC,
- $R^8$ is an identical or different monovalent, optionally halogen-substituted, SiC-bonded aminoalkyl radical having 1 to 30 carbon atoms,
- $R^9$ is an identical or different monovalent $C_1$–$C_6$-alkyl radical,
- c is 0 or 1,
- d is 0, 1, 2 or 3, and
- e is 0, 1, 2 or 3, with the proviso that the sum of c, d and e is not more than 3 and the organopolysiloxanes (B2) have at least one unit of the general formula (IV) in which the sum of c, d and e has the values 0 or 1.

12. The aqueous emulsion as claimed in claim 5, wherein the branched organosiloxanes (B2) containing aminoalkyl groups are composed of units of the general formula (IV)

$$R^7_c R^8_d (OR^9)_e SiO_{\frac{4-c-d-e}{2}}, \tag{IV}$$

in which
- $R^7$ has the meanings of R,
- $R^8$ has the meanings of $R^3$,
- $R^9$ has the meanings of $R^1$,
- c is 0 or 1,
- d is 0, 1, 2 or 3, and
- e is 0, 1, 2 or 3, with the proviso that the sum of c, d and e is not more than 3 and the organopolysiloxanes (B2) have at least one unit of the general formula (IV) in which the sum of c, d and e has the values 0 or 1.

13. The aqueous emulsion as claimed in claim 8, wherein the branched organosiloxanes (B2) containing aminoalkyl groups are composed of units of the general formula (IV)

$$R^7_c R^8_d (OR^9)_e SiO_{\frac{4-c-d-e}{2}}, \tag{IV}$$

in which
- $R^7$ has the meanings of R,
- $R^8$ has the meanings of $R^3$,
- $R^9$ has the meanings of $R^1$,
- c is 0 or 1,
- d is 0, 1, 2 or 3, and e is 0, 1, 2 or 3, with the proviso that the sum of c, d and e is not more than 3 and the organopolysiloxanes (B2) have at least one unit of the general formula (IV) in which the sum of c, d and e has the values 0 or 1.

14. The aqueous emulsion as claimed in claim 5, wherein the radical $R^3$ denotes a radical of the general formula (III)

$$R^5{}_2NR^6—\qquad\qquad\text{(III),}$$

in which

- $R^5$ is identical or different and is hydrogen or a monovalent, optionally substituted $C_1$–$C_{10}$-hydrocarbon radical, or a $C_1$–$C_{10}$-aminohydrocarbon radical, and
- $R^6$ denotes a divalent $C_1$–$C_{15}$-hydrocarbon radical.

15. The aqueous emulsion as claimed in claim 9, wherein the radical $R^3$ denotes a radical of the general formula (III)

$$R^5{}_2NR^6—\qquad\qquad\text{(III),}$$

in which

- $R^5$ is identical or different and is hydrogen or a monovalent, optionally substituted $C_1$–$C_{10}$-hydrocarbon radical, or a $C_1$–$C_{10}$-aminohydrocarbon radical, and
- $R^6$ denotes a divalent $C_1$–$C_{15}$-hydrocarbon radical.

16. The aqueous emulsion as claimed in claim 1, wherein the total amount of components (A) and (B) is 1 to 80% by weight based on the total weight of the aqueous emulsion.

17. The aqueous emulsion as claimed in claim 2, wherein the total amount of components (A) and (B) is 1 to 80% by weight based on the total weight of the aqueous emulsion.

18. The aqueous emulsion as claimed in claim 5, wherein the total amount of components (A) and (B) is 1 to 80% by weight based on the total weight of the aqueous emulsion.

19. A process for imparting water repellency to porous mineral building materials and building coatings and to wood, in which said building materials, building coatings, and wood are treated with an emulsion comprising (A) organosilicon compounds which are selected from
- (A1) $C_1$–$C_{20}$-hydrocarbon-$C_1$–$C_6$-alkoxysilanes or
- (A2) branched organopolysiloxanes containing $C_1$–$C_6$-alkoxy groups;

(B) organosilicon compounds which are selected from
- (B1) $C_1$–$C_6$-alkoxysilanes containing aminoalkyl groups or
- (B2) branched organosiloxanes containing aminoalkyl groups; and (C) an emulsifier.

20. A process for imparting water repellency to porous mineral building materials and building coatings and to wood, in which said building materials, building coatings, and wood are treated with the emulsion as claimed in claim 2.

21. An aqueous emulsion which contains the components (A) organosilicon compounds which are selected from
- (A1) $C_1$–$C_{20}$-hydrocarbon-$C_1$–$C_6$-alkoxysilanes;

(B) organosilicon compounds which are selected from
- (B1) $C_1$–$C_6$-alkoxysilanes containing aminoalkyl groups,
- (B2) branched organosiloxanes containing aminoalkyl groups, or mixtures thereof; and (C) an emulsifier.

22. An aqueous emulsion of organosilicon compounds suitable for increasing water repellancy of building materials, said emulsion comprising one or more silane component(s) and an organopolysiloxane component, said silane components comprising
- (B1) $C_1$–$C_6$-alkoxysilanes bearing aminoalkyl functionality, said organopolysiloxane component consisting essentially of
- (A2) branched $C_1$–$C_{16}$ alkoxy-organopolysiloxanes, and optionally
- (B2) branched organosiloxanes bearing aminoalkyl functionality, said aqueous emulsion further containing an effective amount of an emulsifier.

* * * * *

UNITED STATES PATENT AND TRADEMARK OFFICE
CERTIFICATE OF CORRECTION

PATENT NO.    : 6,294,608 B1
DATED         : September 25, 2001
INVENTOR(S)   : Rudolf Hager et al.

It is certified that error appears in the above-identified patent and that said Letters Patent is hereby corrected as shown below:

<u>Column 18,</u>
Line 15, delete "Q" and insert therefor -- 0 --.

Signed and Sealed this

Fifteenth Day of October, 2002

Attest:

Attesting Officer

JAMES E. ROGAN
Director of the United States Patent and Trademark Office